(12) United States Patent
Xue

(10) Patent No.: US 8,803,939 B2
(45) Date of Patent: Aug. 12, 2014

(54) METHOD AND DEVICE FOR REALIZING VIDEOPHONE

(75) Inventor: Tao Xue, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 317 days.

(21) Appl. No.: 13/496,057

(22) PCT Filed: Oct. 19, 2010

(86) PCT No.: PCT/CN2010/077880
§ 371 (c)(1),
(2), (4) Date: Mar. 14, 2012

(87) PCT Pub. No.: WO2011/050682
PCT Pub. Date: May 5, 2011

(65) Prior Publication Data
US 2012/0176464 A1    Jul. 12, 2012

(30) Foreign Application Priority Data
Oct. 30, 2009    (CN) .......................... 2009 1 0209420

(51) Int. Cl.
*H04N 7/14*    (2006.01)
(52) U.S. Cl.
CPC ..................................... *H04N 7/147* (2013.01)
USPC .................. 348/14.03; 348/14.01; 348/14.04; 348/14.08; 348/200; 348/211.2; 358/2.1; 370/522; 375/240.16; 379/52; 379/199; 379/200; 379/211.01; 379/434; 455/41.2; 455/414.1; 455/422.1; 455/550.1; 455/551; 463/40; 701/431; 704/271; 705/40; 715/753; 715/758
(58) Field of Classification Search
CPC . H04N 7/147; H04L 29/06027; H04W 28/24; G01C 21/362; G06Q 20/102; G06T 11/60; H04M 11/06
USPC .......... 348/14.01, 14.02, 14.03, 14.07, 14.08, 348/207.1, 211.1, 211.2, 14.04; 358/2.1; 370/522; 375/240.16; 379/52, 199, 379/200, 211.01, 211.02, 434; 455/41.2, 455/414.1, 422.1, 550.1, 551; 701/431; 704/271; 705/40; 715/753, 758; 463/40
See application file for complete search history.

(56) References Cited

U.S. PATENT DOCUMENTS 6,812,954 B1 *   11/2004   Priestman et al. .......... 348/14.01
7,072,398 B2 *    7/2006   Ma ........................... 375/240.16
(Continued)

FOREIGN PATENT DOCUMENTS

CN          1674671 A       9/2005
CN        101242512 A       8/2008
(Continued)

OTHER PUBLICATIONS

International Search Report for PCT/CN2010/077880 dated Jan. 17, 2011.

*Primary Examiner* — Gerald Gauthier
(74) *Attorney, Agent, or Firm* — Ling Wu; Stephen Yang; Ling and Yang Intellectual Property

(57) ABSTRACT

A method and apparatus for realizing videophone are provided in the present invention. The method includes setting different videophone modes; and selecting the videophone mode for a user to perform a video conversation by using the selected videophone mode. The apparatus includes a setting module and a control module which is connected with the setting module. With the method and apparatus for realizing videophone according to the present invention, the user can select a normal conversation or a preset audio/video mode according to requirements in the process of the videophone conversation so as to achieve different video effects.

6 Claims, 1 Drawing Sheet

(56) References Cited

U.S. PATENT DOCUMENTS

| | | | |
|---|---|---|---|
| 7,319,746 B2* | 1/2008 | Le Creff et al. | 379/211.02 |
| 7,349,004 B2* | 3/2008 | Priestman et al. | 348/14.01 |
| 8,103,215 B2* | 1/2012 | Rek | 455/41.2 |
| 8,259,153 B1* | 9/2012 | Campbell et al. | 348/14.01 |
| 8,332,142 B2* | 12/2012 | Tanaka | 701/431 |
| 8,363,087 B2* | 1/2013 | Iwabuchi et al. | 348/14.04 |
| 2005/0096134 A1* | 5/2005 | Lippincott | 463/40 |
| 2005/0146621 A1* | 7/2005 | Tanaka et al. | 348/211.2 |
| 2008/0134057 A1* | 6/2008 | Yun | 715/758 |
| 2009/0201359 A1* | 8/2009 | Kan et al. | 348/14.02 |
| 2009/0244256 A1 | 10/2009 | Wheatley et al. | |
| 2010/0241971 A1* | 9/2010 | Zuber | 715/753 |
| 2012/0176464 A1* | 7/2012 | Xue | 348/14.03 |
| 2012/0262535 A1* | 10/2012 | Gratton et al. | 348/14.07 |

FOREIGN PATENT DOCUMENTS

| | | |
|---|---|---|
| CN | 101350845 A | 1/2009 |
| CN | 101697580 A | 4/2010 |
| EP | 2061201 A1 | 5/2009 |

* cited by examiner

METHOD AND DEVICE FOR REALIZING VIDEOPHONE

TECHNICAL FIELD

The present invention relates to the field of a communication technology, and in particular, to a method and apparatus for realizing videophone.

BACKGROUND OF THE RELATED ART

Videophones belong to the field of multimedia communications, and are video systems which have a wide range of application fields, so that an image of the other party is visible for people during a conversation. The videophones are not only suitable for family life, but also are widely applied in a variety of fields of different industries, such as various commercial activities, tele-education, monitoring of confidentiality, hospital care, medical diagnostics, scientific investigation etc., and thus have an extremely broad market prospect.

In the process of existing videophones, the following usage scene often occurs, i.e., there comes a videophone which has to answer but the user does not want the other party understand his surrounding from the process of a video conversation. In order to solve the problem, there are primarily two methods, one of which is to prevent a local image, and use a substitutive picture to transmit to the user on the other side. The other method is to substitute an actual background captured by a camera with a preset background, and use an image which is a combination of the user's head sculpture and the preset background to transmit to the user on the other side. Both of the methods can make his actual background environment be invisible for the user on the other side; however, these methods can only be used between unfamiliar users, and generally the combined effect is not ideal enough.

SUMMARY OF THE INVENTION

In order to solve the above problem, the present invention provides a method and apparatus for realizing videophone, so that a user can select a normal conservation or preset audio/video mode according to requirements to achieve different video effects, thus effectively protecting privacy of the user.

In order to solve the above problem, the present invention provides a method for realizing videophone, comprising:

setting different videophone modes; and selecting a videophone mode for a user to perform a video conversation by using the selected videophone mode.

Preferably, the step of setting different videophone modes comprises: setting different video modes, the video mode is a normal video mode or a distinct preset video mode, the distinct preset video mode refers to values of video image parameters which are used when a video conversation is performed being different, and the video image parameters comprise one or more of the following parameters: a picture brightness parameter, a picture contrast, a picture size, a picture dithering amplitude, a picture refresh rate, and a picture mosaic level.

Preferably, the step of setting different videophone modes comprises: setting different audio modes, the audio mode is a normal audio mode or a distinct preset audio mode, the distinct preset audio mode refers to using a distinct audio file as a background sound when a video conversation is performed.

Preferably, the step of setting different videophone modes comprises: setting a set of distinct video modes and audio modes, wherein, the different videophone modes refer to at least one mode of the video mode and the audio mode being distinct;

the video mode is a normal video mode or a distinct preset video mode, wherein, the distinct preset video mode refers to values of video image parameters which are used when a video conversation is performed being different, and the video image parameters comprise one or more of the following parameters: a picture brightness parameter, a picture contrast, a picture size, a picture dithering amplitude, a picture refresh rate, and a picture mosaic level; and the audio mode is a normal audio mode or a distinct preset audio mode, wherein, the distinct preset audio mode refers to using a distinct audio file as a background sound when a video conversation is performed.

Preferably, the method further comprises switching the selected videophone mode which is used by the user to another videophone mode according to requirements of the conversation, and continuing the video conversation.

In order to solve the above technical problem, the present invention further provides an apparatus for realizing videophone, comprising: a setting module and a control module which is connected with the setting module, wherein, the setting module is configured to set different videophone modes; and the control module is configured to select a videophone mode for a user to perform a video conversation by using the selected videophone mode.

Preferably, the above apparatus further comprises: a combination module, a video module and an audio module which are connected with the control module, wherein, the control module is further configured to select a video mode for the user to control the video module to output video data by using the selected video mode; the video mode is a normal video mode or a distinct preset video mode, wherein, the distinct preset video mode refers to values of video image parameters which are used when a video conversation is performed being different, and the video image parameters comprise one or more of the following parameters: a picture brightness parameter, a picture contrast, a picture size, a picture dithering amplitude, a picture refresh rate, and a picture mosaic level;

the video module is configured to output the corresponding video data according to the processing of the control module;

the audio module is configured to output an actual background sound effect of the conversation in the process of the video conversation; and the combination module is connected with the video module and the audio module respectively, and is configured to combine the corresponding video data output by the video module and the actual background sound effect of the conversation output by the audio module and then output the combined data.

Preferably, the above apparatus further comprises: a combination module, a video module and an audio module which are connected with the control module, wherein, the control module is further configured to select an audio mode for the user to control the audio module to output audio data by using the selected audio mode; the audio mode is a normal audio mode or a distinct preset audio mode, wherein, the distinc preset audio mode refers to using a distinct audio file as a background sound when a video conversation is performed;

the audio module is configured to output the corresponding audio data according to the processing of the control module;

the video module is configured to output actual video data in the process of the video conversation; and the combination module is connected with the video module and the audio module respectively, and is configured to combine the actual video data output by the video module and the corresponding audio data output by the audio module and then output the combined data.

Preferably, the above apparatus further comprises: a combination module, a video module and an audio module which are connected with the control module, wherein, the control module is further configured to select a set of video modes and audio modes for the user to control the video module to output video data by using the selected video mode and to control the audio module to output audio data by using the selected audio mode; different videophone modes refer to at least one mode of the video mode and the audio mode being distinct; the video mode is a normal video mode or a distinct preset video mode, wherein, the distinct preset video mode refers to values of video image parameters which are used when a video conversation is performed being different, and the video image parameters comprise one or more of the following parameters: a picture brightness parameter, a picture contrast, a picture size, a picture dithering amplitude, a picture refresh rate, and a picture mosaic level; and the audio mode is a normal audio mode or a distinct preset audio mode, wherein, the distinct preset audio mode refers to using a distinct audio file as a background sound when a video conversation is performed;

the audio module is configured to output the corresponding audio data according to the processing of the control module;

the video module is configured to output the corresponding video data according to the processing of the control module; and the combination module is connected with the video module and the audio module respectively, and is configured to combine the corresponding video data output by the video module and the corresponding audio data output by the audio module and then output the combined data.

Preferably, the control module is further configured to switch the selected videophone mode which is used by the user to another videophone mode according to requirements of the conversation, and continue the video conversation.

With the method and apparatus for realizing videophone according to the present invention, the user can select a normal conversation or a preset audio/video mode according to requirements in the process the videophone conversation so as to achieve different video effects, which makes the environment of the user be invisible for the other party for protecting the user's privacy, and the counterpart on the other side will not consider that the user deliberately reject to transmit his video. The background noises can also be depressed to the lowest, so that the user on the other side can not identify the place where the user is in from the background noises. Thus, the user can answer a videophone anytime and anywhere without being afraid of encroachment of privacy. This largely improves the usability of a 3rd-generation (3G for short) mobile terminal, and the entertainment of the mobile terminal can be enhanced.

PREFERRED EMBODIMENTS OF THE PRESENT INVENTION

Figure 1:
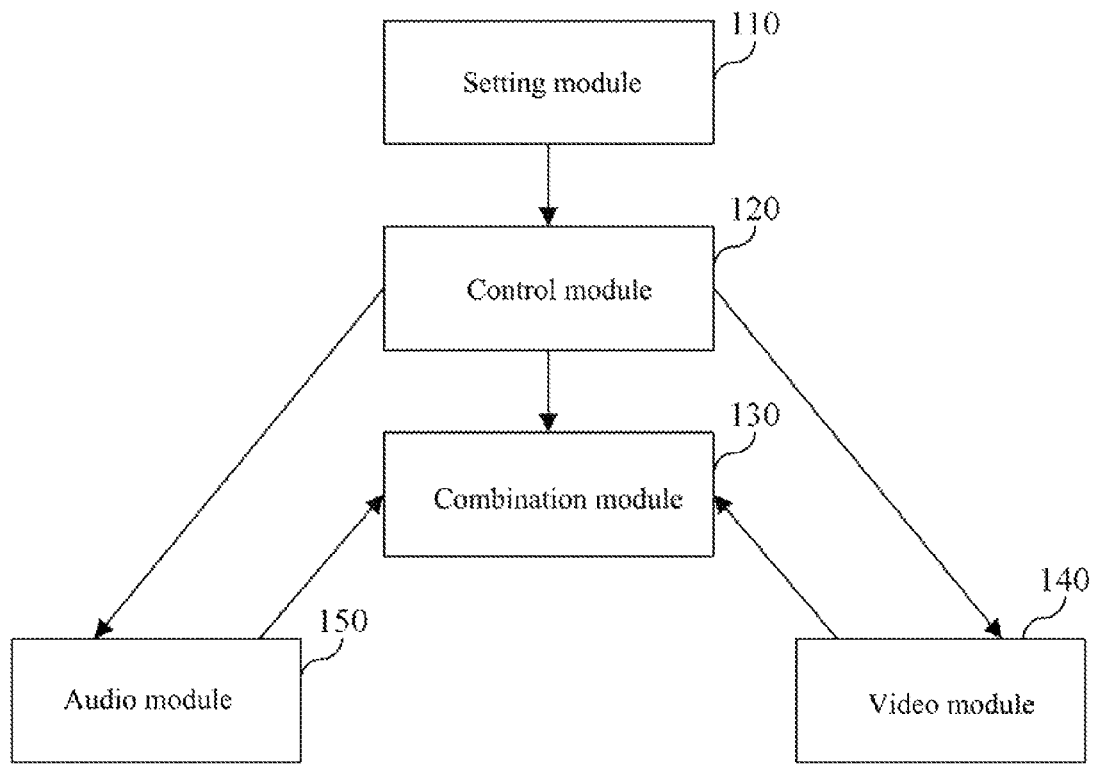
FIG. 1 is a structural diagram of an apparatus for realizing videophone according to an embodiment of the present invention.

As shown in FIG. 1, the apparatus for realizing videophone comprises a setting module 110 and a control module 120 which are connected; and further comprises a combination module 130, a video module 140 and an audio module 150 which are connected with the control module 120; and both the video module 140 and the audio module 150 are connected with the combination module 130.

The setting module 110 is configured to set different videophone modes.

The control module 120 is configured to use a videophone mode selected from the setting module 110 to perform a video conversation; when the videophone mode refers to a video mode, the selected video mode is used to control the video module 140 to output video data; when the videophone mode refers to an audio mode, the selected audio mode is used to control the audio module 150 to output audio data; and when the videophone mode refers to a set of video modes and audio modes, the selected video mode is used to control the video module 140 to output the video data, and the selected audio mode is used to control the audio module 150 to output the audio data, and different videophone modes refer to at least one mode of the video mode and the audio mode being distinct.

The video mode is a normal video mode or a preset video mode, wherein, the distinct preset video mode refers to values of video image parameters which are used when a video conversation is performed being different, and the video image parameters comprise one or more of the following parameters: a picture brightness parameter, a picture contrast, a picture size, a picture dithering amplitude, a picture refresh rate, and a picture mosaic level. The audio mode is a normal audio mode or a preset audio mode, wherein, the distinct preset audio mode refers to using a distinct audio file as a background sound when a video conversation is performed.

The control module 120 is further configured to switch to another videophone mode according to requirements of the conversation and continue the video conversation when a video conversation is performed by a user in the selected videophone mode.

The video module 140 is configured to output corresponding video data according to the processing of the control module 120 when the videophone mode refers to a video mode or refers to a set of video modes and audio modes; and output actual video data in the process of the video conversation when the videophone mode refers to an audio mode.

The audio module 150 is configured to output actual audio data in the process of the video conversation when the videophone mode refers to a video mode; and output corresponding audio data according to the processing of the control module when the videophone mode refers to an audio mode or refers to a set of video modes and audio modes.

The combination module 130 is configured to combine the video data output by the video module 140 and the audio data output by the audio module 150, and then output the combined data.

Figure 2:
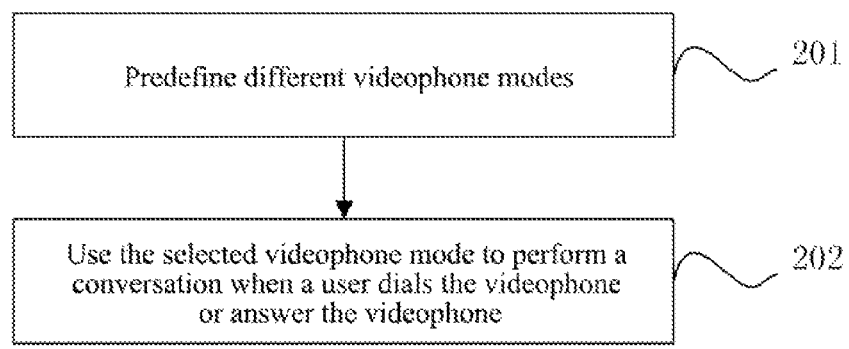
FIG. 2 is a flowchart of a method for realizing videophone according to an embodiment of the present invention.

As shown in FIG. 2, a method for realizing videophone comprises the following steps.

In Step 201, different videophone modes are preset.

In Step 202, the selected videophone mode is used for a conversation when a user dials the videophone or answers the videophone.

The videophone mode refers to a video mode, and the video mode is a normal video mode or a preset video mode. The normal video mode refers to directly transmitting video data captured by a camera of a communication terminal to the other side, and not performing any processing on the captured video data. A distinct preset video mode refers to values of video image parameters which are used when a video conversation is performed being different, and the video image parameters comprise one or more of the following parameters: a picture brightness parameter, a picture contrast, a picture size, a picture dithering amplitude, a picture refresh rate, and a picture mosaic level.

The videophone mode refers to an audio mode, and the audio mode is a normal audio mode or a preset audio mode. The normal audio mode refers to directly transmitting audio data captured by a camera of a communication terminal to the other side. A distinct preset audio mode refers to using a distinct audio file as a background sound when the video conversation is performed. The audio file can also be imported or recorded by the user, and the audio file can embody sound effects in different scenes, such as in rooms, bathrooms, living rooms, stone rooms, auditoriums, concert halls, airports, railway stations, alleyways, forests, downtowns, streets, food markets, parking lots, sewers, and so on.

The videophone mode can also refer to a set of video modes and audio modes, and different videophone modes refer to at least one mode of the video mode and the audio mode being distinct.

The combination of the audio mode and the video mode is determined by a free selection by the user, and is used as a conversation mode of the videophone. When these modes are used, picture quality for example should be not fixed, and in the process of the conversation, the picture quality can be adjusted between best and worse; however, from a probability point of view, the picture quality is in the worst state at most of the time when ensuring the conversation quality so as to ensure the environment where the user is in will not be identified by the other party, and meanwhile the other party will not consider that the user does not want to show the surrounding to him.

In the above method, the user can further switch the videophone mode in the process of performing the video conversation, i.e., selecting another videophone mode to continue the conversation. The user can further recover the normal mode when performing the video conversation in the preset video or the audio mode.

The apparatus and method according to the present invention can be applied to various types of terminals and can facilitate implementing combined functions of multiple video sources. Telecom operators can satisfy the requirements by only making appropriate amendments to the software of the user terminal (increasing corresponding service software modules). The apparatus and method according to the present invention make full use of the simplicity and the ease of transformation of the software upgrade of the user terminal, and can enable multiple video sources to implement the combined functions by only making appropriate amendments to the software of the user terminal. The present invention can further be widely applied in a variety of terminal devices, such as mobile phones, fixed phones etc.

The present invention can effectively protect privacy of a user in the process of the videophone conversation, and the user can select a normal conversation mode or a preset audio/video mode to achieve different video effects according to requirements. In addition, the entertainment of the mobile terminal can also be enhanced.

The above description is only the preferred embodiments of the present invention and is not intended to limit the present invention. Various modifications and variations to the present invention may be made by those skilled in the art. Any modification, equivalent substitution and improvement made within the spirit and principle of the present invention should be included within the protection scope of the present invention.

INDUSTRIAL APPLICABILITY

With the method and apparatus for realizing videophone according to the present invention, the user can select a normal conversation or a preset audio/video mode according to requirements in the process the videophone conversation so as to achieve different video effects, which makes the environment of the user be invisible for the other party for protecting the user's privacy, and the counterpart on the other party will not consider that the user deliberately reject to transmit his video. The background noises can also be depressed to the lowest, so that the user on the other side can not identify the place where the user is in from the background noises. Thus, the user can answer a videophone anytime and anywhere without being afraid of encroachment of privacy. This largely improves the usability of a 3G mobile terminal, and the entertainment of the mobile terminal can be enhanced.

What I claim is:

1. A method for realizing videophone, comprising:
   setting, by a processor of an apparatus for realizing videophone, different videophone modes; and
   selecting, by the processor of an apparatus for realizing videophone, a videophone mode for a user to perform a video conversation by using the selected videophone mode,
   wherein,
   the step of setting different videophone modes comprises:
   setting a set of distinct video modes and audio modes, wherein, the different videophone modes refer to at least one mode of the video mode and the audio mode being distinct;
   the video mode is a normal video mode or a distinct preset video mode, wherein, the distinct preset video mode refers to values of video image parameters which are used when a video conversation is performed being different, and the video image parameters comprise one or more of the following parameters: a picture brightness parameter, a picture contrast, a picture size, a picture dithering amplitude, a picture refresh rate, and a picture mosaic level; and
   the audio mode is a normal audio mode or a distinct preset audio mode, wherein, the distinct preset audio mode refers to using a distinct audio file as a background sound when a video conversation is performed.

2. The method according to claim 1, further comprising:
   switching the selected videophone mode which is used by the user to another videophone mode according to requirements of the conversation, and continuing the video conversation.

3. An apparatus for realizing videophone, comprising:
   a processor; and
   a storage device for storing computer executable instructions that when executed by the processor cause the processor to perform the steps in following modules:
   a setting module configured to set different videophone modes; and
   a control module connected with the setting module, the control module being configured to select a videophone mode for a user to perform a video conversation by using the selected videophone mode, and
   a combination module, a video module and an audio module which are connected with the control module,
   wherein,
   the control module is further configured to select a set of video modes and audio modes for the user to control the video module to output video data by using the selected video mode and to control the audio module to output audio data by using the selected audio mode; different videophone modes refer to at least one mode of the video mode and the audio mode being distinct; the video mode is a normal video mode or a distinct preset video mode, wherein, the distinct preset video mode refers to values of video image parameters which are used when a video conversation is performed being different, and the video image parameters comprise one or more of the following parameters: a picture brightness parameter, a picture contrast, a picture size, a picture dithering amplitude, a picture refresh rate, and a picture mosaic level; and the audio mode is a normal audio mode or a distinct preset audio mode, wherein, the distinct preset audio mode refers to using a distinct audio file as a background sound when a video conversation is performed;

the audio module is configured to output corresponding audio data according to processing of the control module;

the video module is configured to output corresponding video data according to processing of the control module; and the combination module is connected with the video module and the audio module respectively, and is configured to combine the corresponding video data output by the video module and the corresponding audio data output by the audio module and then output the combined data.

4. The apparatus according to claim 3, wherein, the control module is further configured to switch the selected videophone mode which is used by the user to another videophone mode according to requirements of the conversation, and continue the video conversation.

5. An apparatus for realizing videophone, comprising:
a processor; and a storage device for storing computer executable instructions that when executed by the processor cause the processor to perform the steps in following modules:

a setting module configured to set different videophone modes; and a control module connected with the setting module, the control module being configured to select a videophone mode for a user to perform a video conversation by using the selected videophone mode, and a combination module, a video module and an audio module which are connected with the control module, wherein, the control module is further configured to select an audio mode for the user to control the audio module to output audio data by using the selected audio mode; the audio mode is a normal audio mode or a distinct preset audio mode, wherein, the distinct preset audio mode refers to using a distinct audio file as a background sound when a video conversation is performed;

the audio module is configured to output corresponding audio data according to processing of the control module;

the video module is configured to output actual video data in the video conversation process; and the combination module is connected with the video module and the audio module respectively, and is configured to combine the actual video data output by the video module and the corresponding audio data output by the audio module and then output the combined data.

6. The apparatus according to claim 5, wherein, the control module is further configured to switch the selected videophone mode which is used by the user to another videophone mode according to requirements of the conversation, and continue the video conversation.

* * * * *